(12) United States Patent
Iwaki et al.

(10) Patent No.: US 6,989,635 B2
(45) Date of Patent: Jan. 24, 2006

(54) VEHICULAR LAMP WITH CURRENT LIMITING CIRCUIT

(75) Inventors: Kazuhito Iwaki, Shizuoka-ken (JP); Hitoshi Takeda, Shizuoka-ken (JP); Masayasu Ito, Shizuoka-ken (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 201 days.

(21) Appl. No.: 10/670,822

(22) Filed: Sep. 25, 2003

(65) Prior Publication Data

US 2004/0070987 A1 Apr. 15, 2004

(30) Foreign Application Priority Data

Oct. 1, 2002 (JP) .............................. 2002-289282

(51) Int. Cl.
 *B60Q 1/02* (2006.01)
(52) U.S. Cl. .................... 315/82; 315/77; 315/200 A; 315/312; 362/800; 362/806; 362/801
(58) Field of Classification Search ................. 315/82, 315/77, 224, 185 S, 200 A, 312, 324, 800, 315/806, 801; 362/800, 806, 801, 362, 376, 362/377, 543, 545, 546
See application file for complete search history.

(56) References Cited

U.S. PATENT DOCUMENTS

| 6,715,909 B2 * | 4/2004 | Serizawa ..................... 362/545 |
| 6,786,625 B2 * | 9/2004 | Wesson ....................... 362/545 |
| 2002/0043943 A1 * | 4/2002 | Menzer et al. ............... 315/291 |

FOREIGN PATENT DOCUMENTS

JP 2001-215913 8/2001

OTHER PUBLICATIONS

English Abstract, Japanese Patent No. JP2001215913 published Aug. 10, 2001, 1 pg.

* cited by examiner

*Primary Examiner*—Tuyet Thi Vo
(74) *Attorney, Agent, or Firm*—Osha-Liang LLP (57) ABSTRACT

A vehicular lamp used in a vehicle, includes: a light source for emitting light in accordance with power given thereto; a lamp body for accommodating the light source and protecting the light source from water; a first resistor provided in the outside of the lamp body and connected in series with the light source; and a current limiting circuit, provided in the inside of the lamp body, for preventing an excess current supplied to the light source in a case where dump surge occurs in a supplied voltage or current to be supplied to the light source.

8 Claims, 10 Drawing Sheets

VEHICULAR LAMP WITH CURRENT LIMITING CIRCUIT

BACKGROUND OF THE INVENTION

This patent application claims priority from a Japanese patent application No. 2002-289282 filed on Oct. 1, 2002, the contents of which are incorporated herein by reference.

FIELD OF THE INVENTION

The present invention relates to a vehicular lamp used in a vehicle.

DESCRIPTION OF THE RELATED ART

Conventionally, in a case where power is supplied from a power supply to a light source in a vehicular lamp, a limiting resistor is provided in series with the light source in order to prevent an excess current from flowing in the light source as disclosed, for example, in Japanese Patent Application Laid-Open No. 2001-215913, pages 2–4 and FIGS. 7–8. While the light source is placed within a lamp body, the limiting resistor is provided in the outside of the lamp body in order to reduce effect of heat generated by the limiting resistor on the light source and other circuit components. Especially, in a case of using a light-emitting diode as the light source, the limiting resistor has to be provided in the outside of the lamp body because the light-emitting diode is easily influenced by the heat.

Moreover, dump surge such as ignition surge occurs in the vehicle such as a car. Therefore, the vehicular lamp has to include a protection circuit for protecting the light source and the like from the dump surge. Additionally, in order to protect that protection circuit from water and the like, it is necessary to provide the protection circuit in the inside of the lamp body. For these reasons, in the conventional lamp, the protection circuit is arranged between the limiting resistor and the light source. For example, a surge absorber or the like is provided as the protection circuit between the limiting resistor and the light source in parallel to the light source.

However, the protection circuit may not function as protection for the light source in some cases, because the protection circuit is provided in the downstream of the limiting resistor. For example, in a case where the light source is formed by a light-emitting diode and the protection circuit is formed by a surge absorber or the like, a clamping voltage of the surge absorber becomes higher than a forward voltage of the light-emitting diode. Thus, the surge absorber does not function as the protection circuit for the light-emitting diode.

If the protection circuit is provided in the upstream of the limiting resistor so as to make the protection circuit function as protection for the light-emitting diode, the limiting resistor has to be provided in the inside of the lamp body or the protection circuit or wiring therefor should be provided in the outside of the lamp body by means of wirings in the air. This increases the cost. Moreover, in the case where the protection circuit is provided outside of the lamp body, it is difficult to protect the protection circuit itself against water or impact.

As described above, in the conventional vehicular lamp, it is difficult to achieve both simplification of the wiring and protection by providing the protection circuit within the lamp body and the protection of the light source by the protection circuit. Additionally, it is difficult to provide the limiting resistor in the outside of the lamp body while the protection circuit that is effective to the light source is provided.

SUMMARY OF THE INVENTION

Therefore, it is an object of the present invention to provide a vehicular lamp, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a vehicular lamp used in a vehicle, comprises: a light source operable to emit light in accordance with power given thereto; a lamp body operable to accommodate the light source and protect the light source from water; a first resistor provided in an outside of the lamp body and connected in series with the light source; and a current limiting circuit, provided in an inside of the lamp body, operable to prevent an excess current supplied to the light source in a case where dump surge occurs in a supplied voltage or current to be supplied to the light source.

The current limiting circuit may reduce a current flowing through the first resistor in a case where a voltage supplied to the first resistor is equal to or higher than a predetermined voltage.

The vehicular lamp may further comprise a transmission line operable to apply a voltage generated by an external power supply to the current limiting circuit, wherein the current limiting circuit supplies a current received from the transmission line to the first light source via the first resistor in a case where a voltage received from the transmission line is lower than the predetermined voltage, and bypasses at least part of the current received from the transmission line to ground in a case where the voltage received from the transmission line is higher than the predetermined voltage.

The vehicular lamp may be a lamp serving as a taillight of the vehicle and a stop lamp that emits light brighter than the taillight by an external switch; the vehicular lamp may further comprise a second resistor provided in the inside of the lamp body, the second resistor being connected in parallel to the first resistor and in series with the light source and having a larger resistance value than the first resistor; the first resistor may receive power from the external power supply via the switch in a case where the vehicular lamp serves as the stop lamp, and the second resistor may receive the power from the external power supply via the switch in a case where the vehicular lamp serves as the taillight.

The vehicular lamp may be a lamp serving as a taillight of the vehicle and a stop lamp that emits light brighter than the taillight, and the current limiting circuit may include: a switching transistor, connected in series with the light source, operable to repeatedly switch whether or not a current is supplied to the light source; and a duty controller operable to keep the switching transistor in ON-state in a case where the vehicular lamp serves as the stop lamp and to control a duration ratio of an ON-state and an OFF-state of the switching transistor to control power to be supplied to the light source in a case where the vehicular lamp serves as the taillight.

The current limiting circuit may be provided between the first resistor and the light source, detect a resistor current flowing through the first resistor and bypass a part of the resistor current to ground in a case where the detected resistor current is larger than a predetermined current.

The current limiting circuit may include: a limiting transistor, provided between the first resistor and the light source, operable to limit a current supplied from the first resistor to the light source, and a controlling transistor operable to bypass a part of the resistor current to the ground and make the limiting transistor limit the current supplied to the light source, in a case where the resistor current is larger than the predetermined current.

The vehicular lamp may be a lamp serving as a taillight of the vehicle and a stop lamp that emits light brighter than the taillight, and the vehicular lamp may further comprise: a chopper controller operable to turn the light source on and off to reduce brightness of the light source; a first transmission line operable to supply a power-supply voltage generated by an external power supply to the first resistor in a case where the vehicular lamp serves as the stop lamp; and a second transmission line operable to supply the power-supply voltage to the chopper controller to make the light source emit light with reduced brightness in a case where the vehicular lamp serves as the taillight.

The chopper controller may include: a switching transistor operable to repeatedly switch whether or not a current generated by the external power supply is supplied to the light source; and a duty controller operable to control a duration ratio of an ON-state and an OFF-state of the switching transistor, and the duty controller turns the switching transistor off in a case where the first transmission line supplies the power-supply voltage to the first resistor.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
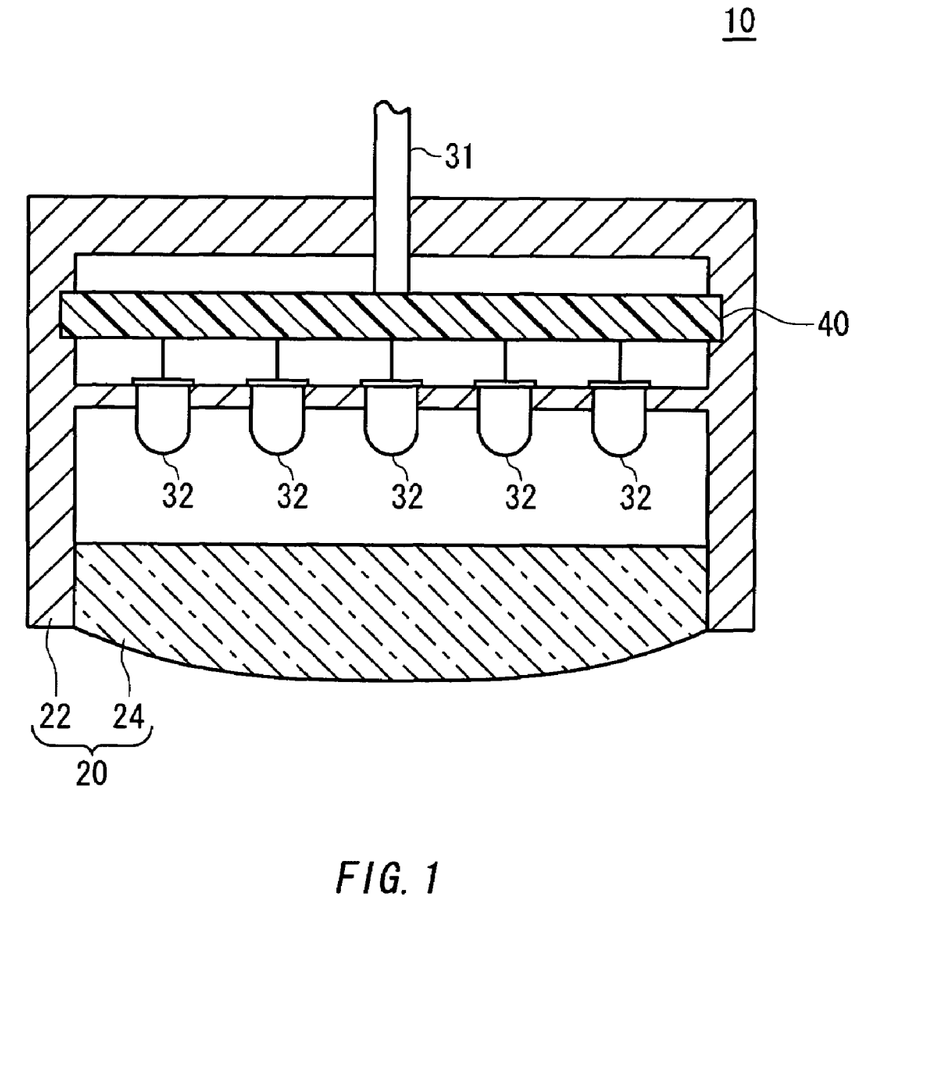
FIG. 1 shows an exemplary cross-section of a vehicular lamp according to an embodiment of the present invention.

FIG. 1 shows an exemplary cross-section of a vehicular lamp 10 according to an embodiment of the present invention. The vehicular lamp 10 is provided on the body of a vehicle such as a car, and is used as a stop lamp, taillight, turn signal and the like.

The vehicular lamp 10 includes a lamp body 20, a circuit board 40, a plurality of light source units 30 and a wiring 31. The lamp body 20 has a transmitting part 24 that transmits light generated by a light source 32 and a holder 22 for storing the circuit board 40 and a plurality of light sources 32. The transmitting part 24 may be a lens that can diffuse or converge the light generated by the light source 32. The lamp body 20 has a function of protecting the light sources 32 and the circuit board 40 from water. That is, the lamp body 20 seals the light sources 32 and the circuit board 40 therein. The lamp body 20 may have an opening that can be blocked when the lamp body 20 is attached to the body of the vehicle so as to seal and protect the light sources 32 and the circuit board 40 from water.

The light sources 32 emit light by power given thereto. In this example, the light sources 32 are light-emitting diodes. The circuit board 40 controls the power supplied to the light sources 32. To the circuit board 40, the power is supplied from an external power supply via the wiring 31. The circuit board 40 adjusts the thus supplied power and then supplies the adjusted power to the light sources 32. In this example, a battery for vehicle such as a car serves as the above-mentioned external power supply. Although the vehicular lamp 10 includes a plurality of light sources 32 in this example, the vehicular lamp 10 may include a single light source 32 in an alternative example.

Figure 2:
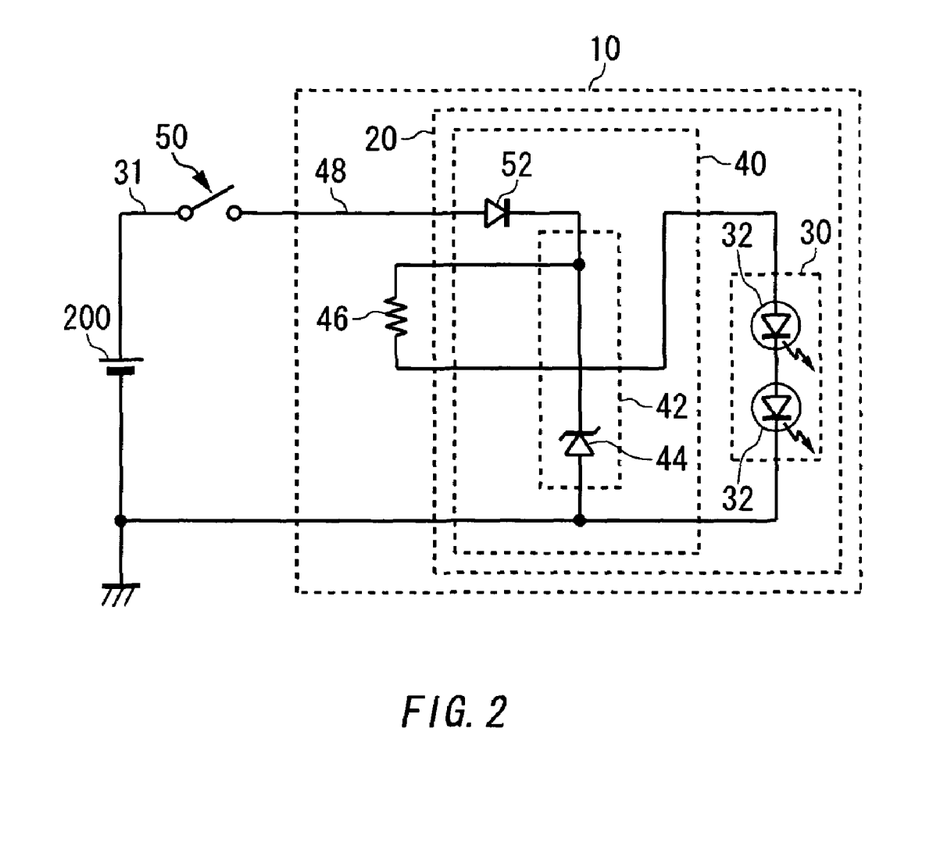
FIG. 2 shows an exemplary circuit structure of the vehicular lamp.

FIG. 2 shows an exemplary circuit structure of the vehicular lamp 10. The vehicular lamp 10 has a function of protecting the light source unit 30 from dump surge or the like. In this example, the vehicular lamp 10 includes a single light source unit 30, and further includes the first resistor 46 that is provided in the outside of the lamp body 20 and is connected in series with the light source unit 30, and a transmission line 48 for supplying a voltage generated by the external power supply 200 to the circuit board 40 via an external switch 50.

The first resistor 46 is a resistor for defining a supplied current to be supplied to the light source unit 30. The first resistor 46 may be fixed to the outer surface of the lamp body 20 or to the wiring 31, for example. It is preferable that the first resistor 46 and the wiring 31 be protected from water. The switch 50 can be a switch operable by a user of the vehicle, such as a brake switch working with a brake pedal of the vehicle or a lamp switch provided in a driver's side in the vehicle.

On the circuit board 40 are provided a current limiting circuit 42 for preventing an excess current from being supplied to the light source unit 30 when dump surge occurred in the supplied voltage or current to be supplied to the light source unit 30, and a diode 52 for supplying a forward current to the light source unit 30. The transmission line 48 applies a power-supply voltage supplied from a power supply 200 to the first resistor 46 and the current limiting circuit 42.

The current limiting circuit 42 reduces the current flowing through the first resistor 46 when the power-supply voltage supplied to the first resistor 46 is equal to or higher than a predetermined voltage. Please note that the predetermined voltage is a voltage lower than the voltage that causes the light source 30 to be broken down. In other words, in a case where an excess voltage is applied because of dump surge or the like, the current supplied from the transmission line 48 to the first resistor 46 is reduced, thereby preventing the light source unit 30 from being broken down.

In this example, when receiving the power-supply voltage, that is lower than the predetermined voltage, from the transmission line 48 via the diode 52, the current limiting circuit 42 supplies the current received from the transmission line 46, to the light source unit 30 via the first resistor 46. On the other hand, when receiving the power-supply voltage higher than the predetermined voltage from the transmission line 48, the current limiting circuit 42 bypasses at least part of the current received from the transmission line 48 to ground. The diode 52 is provided between the switch 50 and the current limiting circuit 42 and prevents a reverse current from the current limiting circuit 42 to the switch 50.

The current limiting circuit 42 includes a Zener diode 44 connected in the reverse direction between the transmission line 48 and the ground. In a case where a power-supply voltage higher than the withstand voltage of the Zener diode 44 is applied to the current limiting circuit 42, at least part of the current received from the transmission line 48 is bypassed to the ground via the Zener diode 44. At this time, to the first resistor 46 and the light source unit 30 connected in series, the supplied voltage clamped by the Zener diode is applied and the supplied current in accordance with that supplied voltage is also supplied. Thus, the current to be supplied to the light source unit 30 is controlled to the predetermined current or lower, thereby the breakdown of the light source unit 30 can be prevented. Moreover, it is desirable that the withstand voltage of the Zener diode 44 be higher than the power-supply voltage generated by the power supply 200 and be lower than the voltage that causes the light source unit 30 to be broken down. In addition, the current limiting circuit 42 may include a surge absorber in place of the Zener diode 44.

The first resistor 46 supplies the received current to the light source unit 30. The light source unit 30 emits light in accordance with the received current. The light source unit 30 may be formed by a plurality of light sources 32 connected in series. It should be noted that the light source 32 is formed by a light-emitting diode.

In the vehicular lamp 10 of the present example, the power-supply voltage is first supplied to the current limiting circuit 42 in the inside of the lamp body 20, which then detects whether or not dump surge or the like occurs. The current limiting circuit 42 then supplies the current received from the transmission line 48, to the first resistor 46 in the outside of the lamp body 20 in a case where no dump surge was detected. Thus, it is possible to protect the light source unit 30 from an excess current such as dump surge irrespective of the magnitude of the forward voltage of the light source 32 in the light source unit 30.

Moreover, the first resistor 46 can be provided in the outside of the lamp body 20 because the current limiting circuit 42 outputs the received current to the outside of the lamp body 20. Thus, increase of heat within the lamp body 20 caused by heat generation in the first resistor 46 can be reduced, allowing the vehicular lamp 10 to operate precisely. In addition, since the current limiting circuit 42 is provided in the inside of the lamp body 20, the current limiting circuit 42 can be protected.

Furthermore, the circuit structure can be simplified because no wiring in the air is required as compared to a case where the protection circuit or wiring therefor is provided in the outside of the lamp body 20, for clamping the voltages on the higher-voltage side and the lower-voltage side of the power supply 200.

Figure 3:
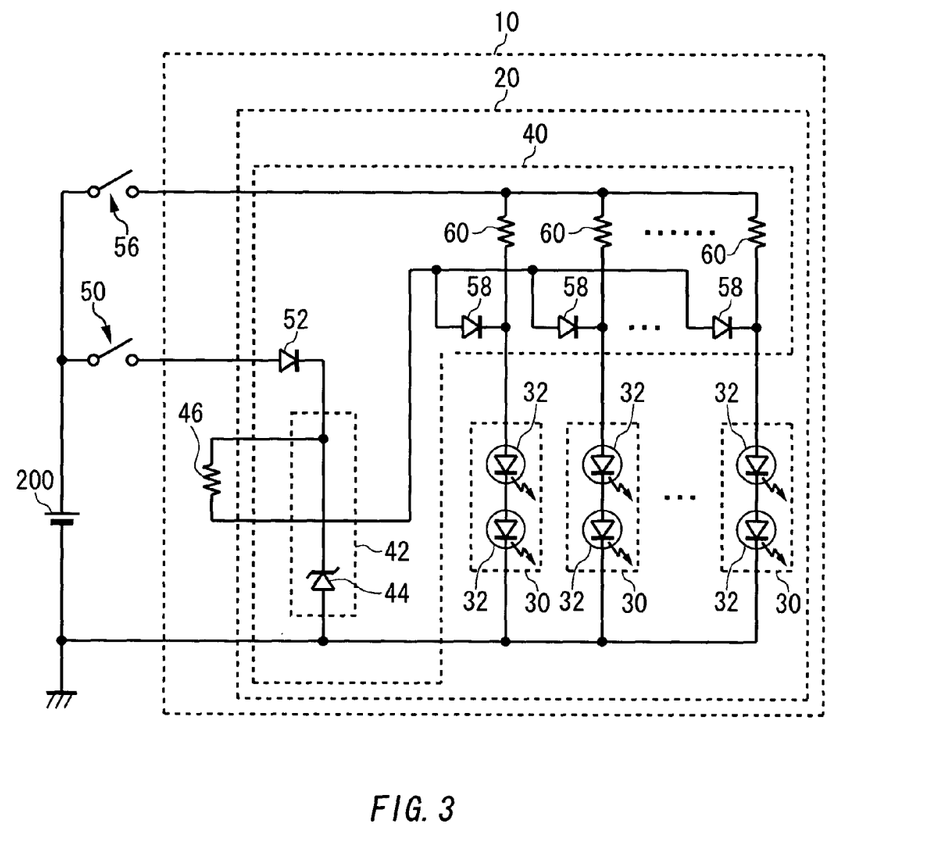
FIG. 3 shows another exemplary circuit structure of the vehicular lamp.

FIG. 3 shows another exemplary circuit structure of the vehicular lamp 10. The vehicular lamp 10 in the present example serves as a taillight of the vehicle such as a car, and a stop lamp that emits brighter light than the light emitted by the taillight. The vehicular lamp 10 in the present example includes a plurality of light source units 30, and further includes a plurality of second resistors 60 and a plurality of diodes 58 in addition to the circuit structure described referring to FIG. 2. The components in FIG. 3 labeled with the same reference numerals as those in FIG. 2 have the same or similar functions and structures as/to those described referring to FIG. 2. The first resistor 46 is connected in series with each of the light source units 30 that are provided in parallel, thereby supplying the power to each light source unit 30. Moreover, the vehicular lamp 10 is connected to an external light source 200 via switches 50 and 56.

The second resistors 60 are provided on the circuit board 40 in the inside of the lamp body 20 in parallel to the first resistor 46. Each second resistor 60 is connected to the corresponding one of the light source units 30 in series. Moreover, the second resistors 60 have resistor values larger than that of the first resistor 46.

In a case where the vehicular lamp 10 serves as the stop lamp, the switch 50 is turned on, and then the first resistor 46 receives the power from the external power supply 200 via the switch 50, thereby the power-supply voltage is applied to the current limiting circuit 42. As described referring to FIG. 2, when the power-supply voltage is lower than a predetermined voltage, the power is supplied to the respective light source units 30 via the first resistor 46 and the respective diodes 58.

In a case where the vehicular lamp 10 serves as a taillight, the switch 56 is turned on, and then the second resistors 60 receive the power from the external power supply 200 via the switch 56, thereby the power is supplied to the respective light source units 30. Since the second resistors 60 have the resistance values larger than that of the first resistor 46, the power supplied to each light source unit 30 is lower than the power supplied in the case of the stop lamp. In a case where the vehicular lamp 10 includes a plurality of light source units 30 connected in parallel to each other as in this example, it is preferable that the resistance value of the second resistor 60 be larger than the value obtained by multiplying the resistance value of the first resistor 46 by the number of the light source units 30. In this manner, the light source unit 30 can emit light having weaker light intensity as compared to the case where the vehicular lamp 10 serves as the stop lamp. In addition, since the resistance value of the second resistor 60 is larger, even if dump surge or the like occurred, the power that is supplied to the respective light source units 30 can be suppressed.

According to the vehicular lamp 10 in this example, in a case where the vehicular lamp 10 is made to operate in a plurality of modes in which light intensities are different, such as a taillight mode or stop-lamp mode, the current limiting circuit 42 is provided for a transmission line used in the mode that may be more largely influenced by dump surge or the like. Therefore, it is possible to efficiently protect the light source unit 30 by a smaller scale circuit.

Figure 4:
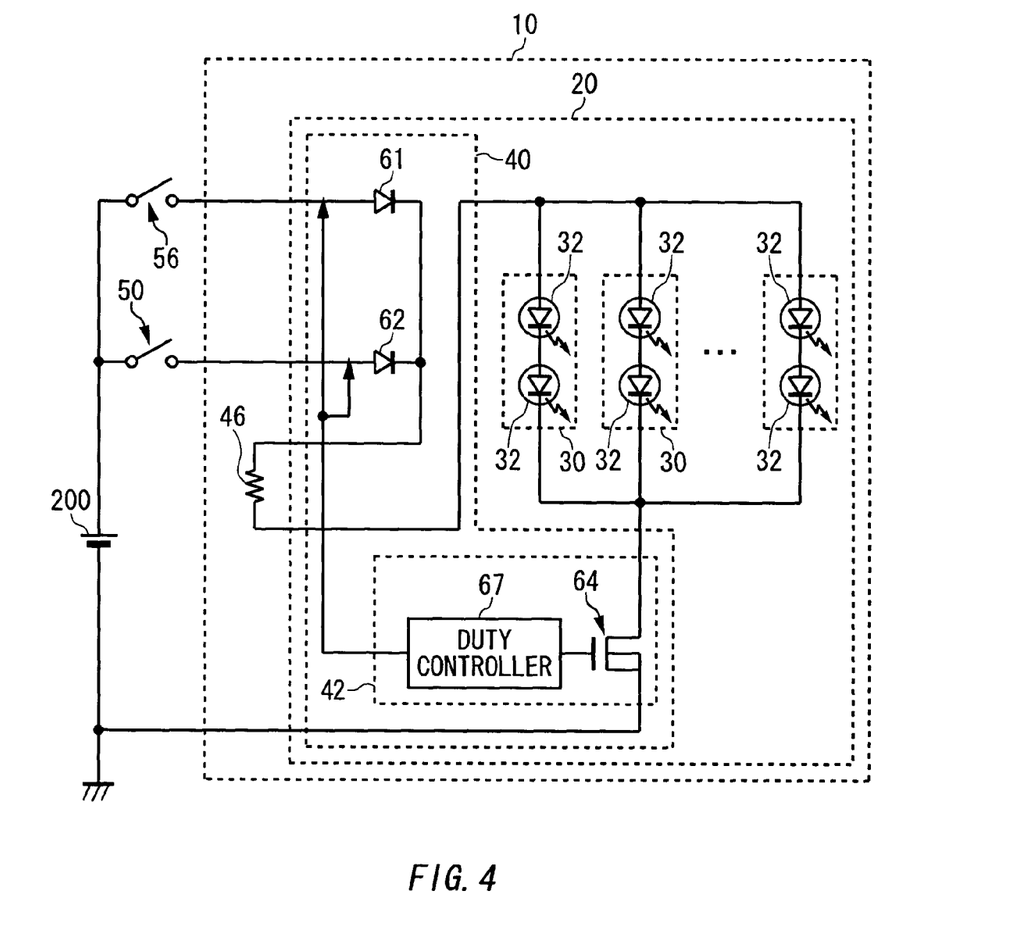
FIG. 4 shows still another exemplary circuit structure of the vehicular lamp.

FIG. 4 shows still another example of circuit structure of the vehicular lamp 10. The vehicular lamp 10 in this example serves as a taillight of the vehicle such as a car, and a stop lamp that emits brighter light than the taillight. In a case of the taillight, the vehicular lamp 10 performs chopper control for the current flowing through the light source unit 30 to control the light amount of the light emitted by the light source unit 30.

The vehicular lamp 10 in the present example includes the first resistor 46 provided in the outside of the lamp body 20, the current limiting circuit 42 provided on the circuit board 40 in the inside of the lamp body 20, diodes 61, 62 provided on the circuit board 40 in the inside of the lamp body 20 and a plurality of light source units 30 provided in the inside of the lamp body 20. The vehicular lamp 10 is connected to the power supply 200 via the switches 50 and 56, as is the case with the vehicular lamp 10 described referring to FIG. 2.

The diode 61 is provided in series with the switch 56 and, when the switch 56 is turned on, supplies to the inside of the circuit board 40 a power-supply current supplied from the power supply 200. The diode 62 is provided in series with the switch 50 and, when the switch 50 is turned on, supplies to the inside of the circuit board 40 the power-supply current supplied from the power supply 200. The circuit board 40 supplies the thus received power-supply current to the light source units 30 via the first resistor 46 provided in the outside of the lamp body 20.

The current limiting circuit 42 includes a switching transistor 64 and a duty controller 67. The switching controller 64 is connected in series with a plurality of light source units 30 and switches whether or not a current is supplied to the light source units 30. The duty controller 67 keeps the switching transistor 64 in an ON-state in a case where the vehicular lamp 10 serves as a stop lamp, and controls a duty ratio that is a ratio of duration of the ON-state and OFF-state of the switching transistor 64 so as to control the power supplied to the light source units 30 in a case where the vehicular lamp 10 serves as a taillight.

The switching transistor 64 is provided in series with each of the light source units 30 and switches whether or not the current is caused to flow in the light source units 30 based on the voltage applied to a gate terminal of the transistor 64. The switching transistor 64 is formed by a MOS transistor, for example.

The duty controller 67 detects, in the inside of the circuit board 40, the current flowing through the diodes 61 and 61 or given voltage, and determines based on the detected current or voltage whether or not the vehicular lamp 10 is in the taillight mode or stop-lamp mode. In other words, by detecting which one of the diodes 61 and 62 the power-supply current is supplied to, the duty controller 67 detects which one of the switches 56 and 60 is turned on and then determines the operation mode in which the vehicular lamp 10 is to operate. Moreover, the duty controller 67 may control the current flowing through the respective light source units 30 to be approximately zero by turning the switching transistor 64 off when detecting dump surge or the like in the detected current. It is preferable that the switching transistor 64 have a withstand voltage higher than the voltage of dump surge or the like. In this manner, it is possible to reduce the power supplied to the light source units 30 in dump surge, thus preventing the light source units 30 from being damaged.

According to the vehicular lamp 10 in this example, since the first resistor 46 is provided in the outside of the lamp body 20, the temperature increase in the inside of the lamp body 20 caused by the heat generation in the first resistor 46 can be reduced. This, the vehicular lamp 10 can emit light precisely. In addition, since the duty controller 67 is provided in the inside of the lamp body 20, the duty controller 67 can be protected. Moreover, since the duty controller 67 detects the power-supply current in the circuit board 40, no wiring in the air is required for detecting the power-supply current and therefore the vehicular lamp 10 can be simplified. Furthermore, the second resistors 60 can be removed from the structure of the vehicular lamp 10 shown in FIG. 3. Thus, the temperature increase in the inside of the lamp body 20 can be further reduced.

Figure 5:
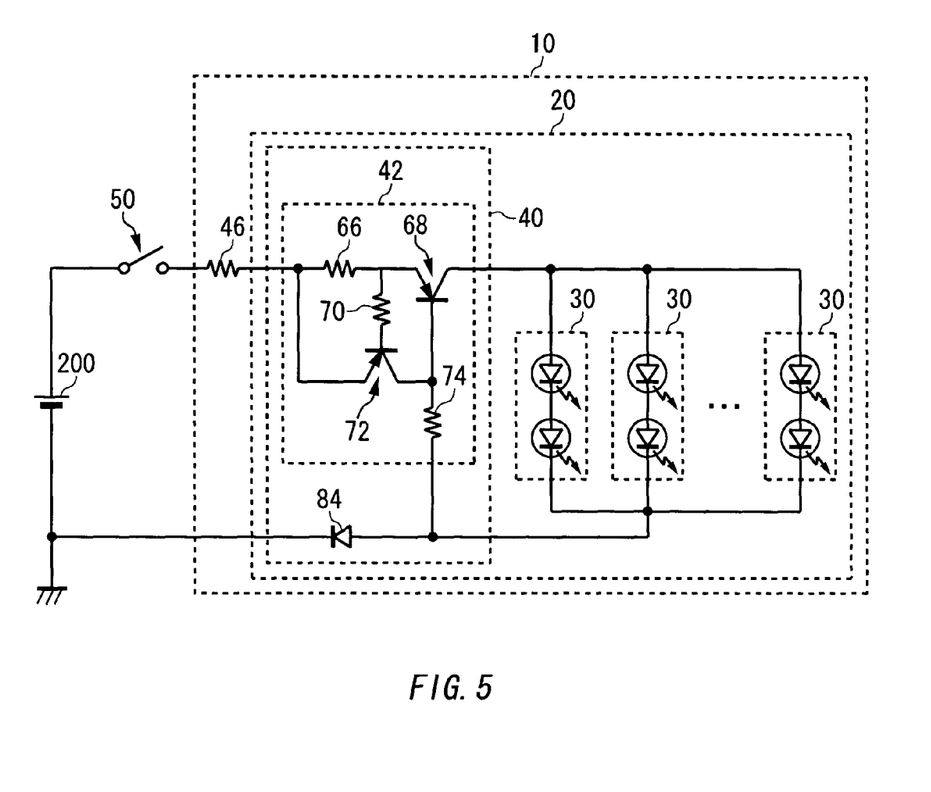
FIG. 5 shows still another exemplary circuit structure of the vehicular lamp.

FIG. 5 shows still another example of the circuit structure of the vehicular lamp 10. In FIG. 5, the components labeled with the same reference numerals as those in FIG. 2 have the same or similar functions and structures as/to those described referring to FIG. 2. The vehicular lamp 10 in this example includes the first resistor 46 provided in the outside of the lamp body 20, a plurality of light source units 30 provided in the inside of the lamp body 20, a diode 84 for preventing a reverse current, and a current limiting circuit 42 provided on a circuit board 40 in the inside of the lamp body 20.

The current limiting circuit 42 is provided between the first resistor 46 and a plurality of light sources units 30, and detects a resistor current that is a current flowing through the first resistor 46, so as to control based on the detected resistor current a supplied current that is a current to be supplied to the light source units 30. The current limiting circuit 42 includes a shunt resistor 66, a base resistor 70, a limiting transistor 68, a controlling transistor 72 and a bypass resistor 74.

The limiting transistor 68 is provided between the first resistor 46 and a plurality of light source units 30 and limits the current that is supplied from the first resistor 46 to the light source units 30. The controlling transistor 72 causes the limiting transistor 68 to limit the current to be supplied to the light source units 30 in a case where the resistor current is larger than a predetermined current.

The shunt resistor 66 is a resistor for detecting the resistor current. One end of the shunt resistor 66 is connected to the first resistor 46 and the other end is connected to the base resistor 70 and an emitter terminal of the limiting transistor 68. The base resistor 70 is connected to the shunt resistor 66 and the emitter terminal of the limiting transistor 68 at one end and is also connected to the base terminal of the controlling transistor 72 at the other end. The bypass resistor 74 is connected to a base terminal of the limiting transistor 68 and a collector terminal of the controlling transistor 72 at one end, and is also connected to ground at the other end.

When the resistor current is smaller than the predetermined current, that is, voltage drop in the shunt resistor 66 due to the resistor current is smaller than a threshold voltage of the controlling transistor 72, the controlling transistor 72 is in the ON-state while the limiting transistor 68 is in the OFF-state. Therefore, the resistor current is supplied to the light source units 30.

When the resistor current is larger than the predetermined current, that is, the voltage drop in the shunt resistor 66 due to the resistor current is larger than the threshold voltage of the controlling transistor 72, the controlling transistor 72 is placed in ON-state and therefore a part of the resistor current is bypassed to the ground via the controlling transistor 72 and the bypass resistor 74. At this time, the limiting transistor 68 is controlled to reduce the current to be supplied to the light source units 30 by the voltage that drops in the bypass resistor 74. In this manner, the current limiting circuit 42 in this example controls the current to be supplied to the light source units 30 in such a manner that the voltage that drops in the shunt resistor 66 is approximately equal to the base-emitter voltage of the controlling transistor 72, when the resistor current larger than the predetermined current was detected.

According to the current limiting circuit 42 in this example, the current to be supplied to the light source units 30 can be reduced when the resistor current becomes larger than the predetermined current. Moreover, even in a case where a large current increase such as dump surge or the like occurred, the large power is applied to the transistor 68 for a short time only. Therefore, heat generation can be reduced. In addition, since the resistor current flowing through the first resistor 46 is detected and the current supplied to the light source units 30 is controlled based on the detected resistor current, it is possible to provide the first resistor 46 in the outside of the lamp body 20 and the current limiting circuit 42 in the inside of the lamp body 20. Thus, the temperature increase in the inside of the lamp body 20 caused by heat generation in the first resistor 46 can be reduced. Furthermore, the current limiting circuit 42 can be protected.

Figure 6:
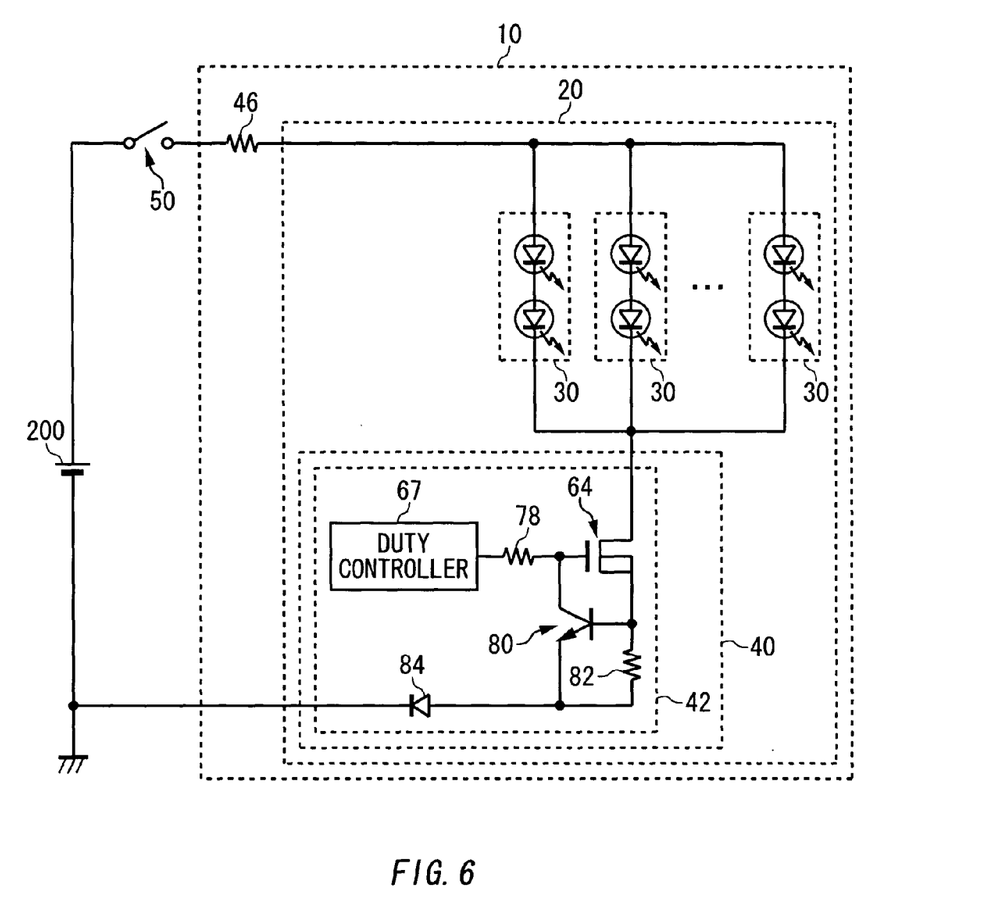
FIG. 6 shows still another exemplary circuit structure of the vehicular lamp.

FIG. 6 shows still another example of circuit structure of the vehicular lamp 10. The vehicular lamp 10 in this example serves as a taillight of the vehicle such as a car, and a stop lamp that emits brighter light than the taillight, for example. In a case of the taillight, the vehicular lamp 10 performs chopper control for the current flowing through the light source unit 30 so as to control the light amount of the light emitted by the light source unit 30. In FIG. 6, the components labeled with the same reference numerals as those in FIG. 4 have the same or similar function and structures as/to the components described referring to FIG. 4. The vehicular lamp 10 in this example includes the first resistor 46 provided in the outside of a lamp body 20, a plurality of light source units 30 provided in the inside of the lamp body 20, and a current limiting circuit 42 provided on a circuit board 40 in the inside of the lamp body 20.

An external switch 50 switches whether or not power is supplied to a plurality of light source units 30. The first resistor 46 is provided between a power supply 200 and a plurality of light source units 30.

The current limiting circuit 42 is provided between a plurality of light source units 30 and the ground, and switches based on a supplied current to be supplied to the light source units 30 whether or not the supplied current is allowed to flow in the light source units 30. The current limiting circuit 42 includes a duty controller 67, a gate resistor 78, a switching transistor 64, a shunt resistor 82, a controlling transistor 80 and a diode 84 for preventing a reverse current.

The switching transistor 64 is a MOS transistor, and switches whether or not the supplied current is supplied to the light source units 30. The duty controller 67 supplies a signal for turning the switching transistor 64 on or off to a gate terminal of the switching transistor 64 via the resistor 78. For example, in a case where the vehicular lamp 10 serves as the stop lamp, the switching transistor 64 is kept in the ON-state. In a case of the taillight, the duty controller 67 turns the switching transistor 64 on and off repeatedly, thereby controlling the duration ratio of the ON-state and OFF state so as to control the power to be supplied to the light source units 30.

The shunt resistor 82 is a resistor provided between the switching transistor 64 and the ground, for detecting the supplied current to be supplied to the light source units 30. The controlling transistor 80 is connected between the resistor 78 and the gate terminal of the switching terminal 64 at its connecter terminal; is connected to the ground at its emitter terminal; and is connected between the switching transistor 64 and the shunt resistor 82 at its base terminal.

The controlling transistor 80 controls the gate voltage of the switching transistor 64 based on whether or not the supplied current flowing through the shunt resistor 82 is larger than a predetermined current, thereby controlling the switching transistor 64. That is, in a case where the voltage drop in the shunt resistor 82 due to the supped current is larger than a threshold voltage of the controlling transistor 80, the controlling transistor 80 starts to make the current flow therethrough, so as to bypass a part of the signal generated by the duty controller 67 to the ground and reduce the collector current of the switching transistor 64.

According to the vehicular lamp 10 in this example, even if chopper control is performed, when the current largely increases due to dump surge or the like, an excess current can be prevented from being supplied to the light source units 30 by reducing the collector current of the switching transistor 64. Moreover, according to the vehicular lamp 10 in this example, the supplied current to be supplied to the light source units 30 can be controlled in such a manner that the voltage that drops in the shunt resistor 82 is approximately equal to the base-emitter voltage of the controlling transistor 80. In addition, by providing the switching transistor 64 for performing chopper control in the current limiting circuit 42, both the protection of the circuit by limiting the current and the chopper control can be performed by the same number of transistors as the number of the transistors in the vehicular lamp 10 shown in FIG. 5.

Figure 7:
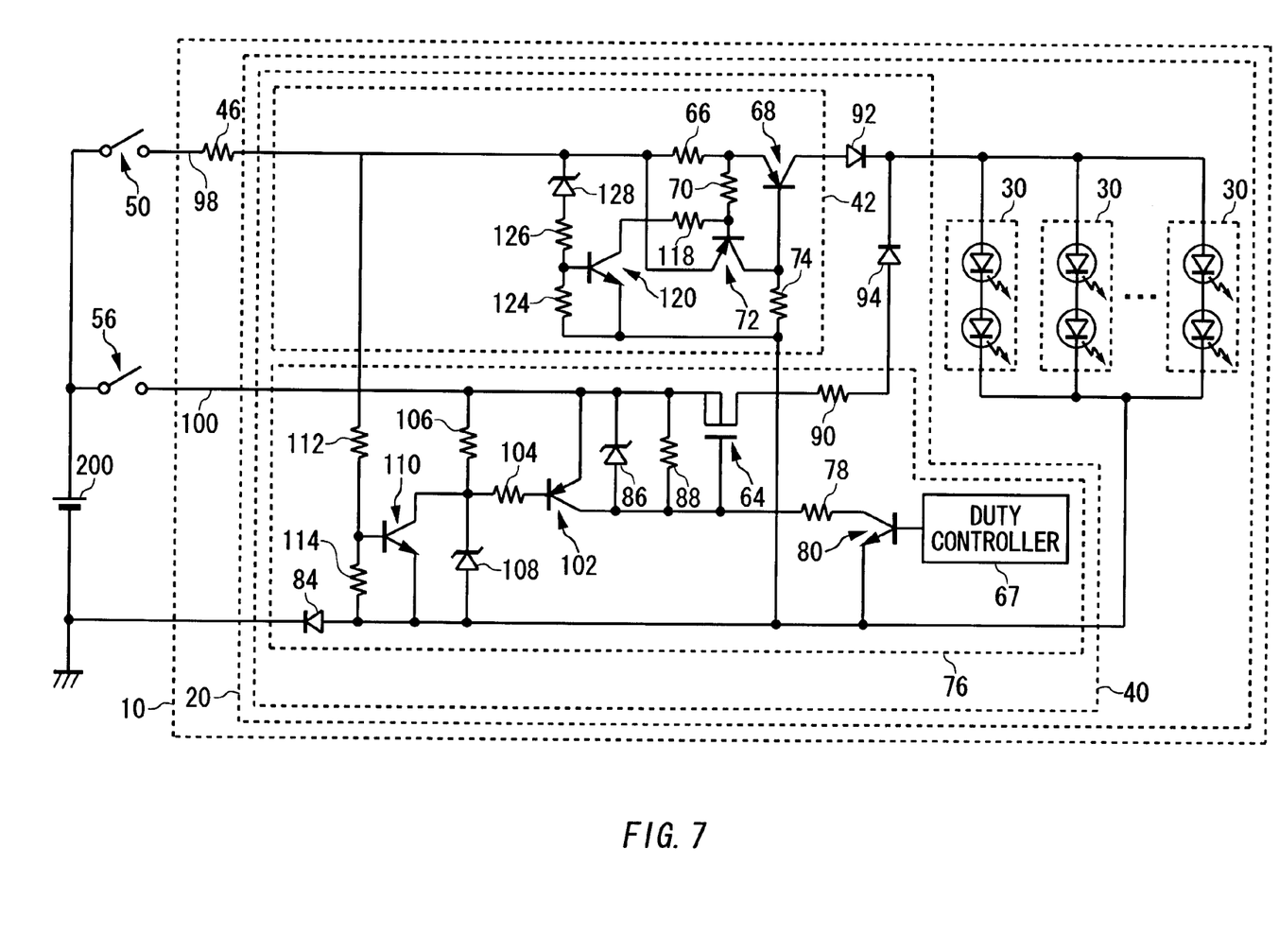
FIG. 7 shows still another exemplary circuit structure of the vehicular lamp.

FIG. 7 shows still another example of circuit structure of the vehicular lamp 10. The vehicular lamp 10 in this example serves as a taillight of the vehicle such as a car, and a stop lamp that emits brighter light than the taillight, for example. In a case of the taillight, the vehicular lamp 10 performs chopper control for the current flowing through the light source unit 30 so as to control the light amount of the light emitted by the light source unit 30. The vehicular lamp 10 includes the structure shown in FIG. 5 and further includes a chopper controller 76 provided on a circuit board 40 in the inside of a lamp body 20 and diodes 92 and 94. Moreover, the vehicular lamp 10 is connected to an external power supply 200 via switches 50 and 56 as is the case with the vehicular lamp 10 shown in FIG. 2.

In a case where the vehicular lamp 10 serves as the stop lamp, the switch 50 is turned on. Then, the first transmission line 98 supplies a power-supply voltage and power-supply current from the power supply 200, to a current limiting circuit 42 via the first resistor 46.

The current limiting circuit 42 includes the circuit structure of the current limiting circuit 42 shown in FIG. 7 and further includes a Zener diode 128, a resistor 126, a resistor 124, a resistor 118 and a transistor 120. These listed components bypass a part of the power-supply current supplied from the first transmission line 98 to the ground, when dump surge or the like occurred.

The Zener diode 128 is connected between the first resistor 46 and the shunt resistor 66 at one end and is connected to the ground at the other end via the resistors 126 and 124. It should be noted that the other end of the Zener diode 128 and the resistors 126 and 124 are connected in series. When the power-supply voltage applied to the first resistor 46 becomes higher than a predetermined voltage due to dump surge or the like, the Zener diode 128 supplies a part of the power-supply current to the resistor 126. In this case, the part of the current that was supplied to the resistor 126 is bypassed to the ground via the resistor 124.

The transistor 120 is connected between the resistors 124 and 126 at its base terminal; is connected to the ground at its emitter terminal; and is connected to its base terminal of the transistor 72 via the resistor 118 at a collector terminal. When the current flows through the resistors 126 and 124 due to the occurrence of dump surge or the like, the transistor 120 is turned on and therefore a part of the current that was supplied to the resistor 66 is bypassed to the ground via the resistors 70 and 118, lowering the base voltage of the transistor 72. Thus, the transistor 72 is turned on and the transistor 68 is made to become off, thereby the supplied current can be reduced. In this manner, when dump surge or the like occurred, the supplied current to be supplied to the light source units 30 is reduced, thus preventing the light source units 30 from being damaged.

In a case of the taillight, the switch 56 is turned on and therefore the second transmission line 100 supplies the power-supply voltage and current from the power supply 200, to the chopper controller 76 provided between the second transmission line 100 and the light source units 30. The chopper controller 76 turns the light source units 30 on and off based on the thus received power-supply voltage and current, thereby reducing the brightness of the light source units 30.

The chopper controller 76 includes a Zener diode 86, a resistor 88, a switching transistor 64, a resistor 90, a resistor 78, a controlling transistor 80 and a duty controller 67.

The switching transistor 64 is provided-between the second transmission line 100 and the light source units 30 in series with them, and supplies the power for which chopper control was performed to the light source units 30 by going on and off. The switching transistor 64 switches, based on the voltage given to the gate terminal thereof, whether or not the power-supply voltage and current received from the second transmission line 100, to the light source units 30 via the resistor 90 and the diode 94. In this example, the switching transistor 64 is formed by a MOS transistor. The resistor 90 is a resistor for defining the supplied current to be supplied to the light source units 30 and may have a resistance value equal to the resistance value of the first resistor 46. Since the current for which chopper control was performed flows through the resistor 90, the power consumed in the resistor 90 is less than that consumed in the first resistor 46. Thus, the temperature increase in the inside of the lamp body 20 due to heat generation in the resistor 90 is less as compared to a case where the first resistor 46 is provided in the inside of the lamp body 20.

The controlling transistor 80 is connected at its collector terminal to the gate terminal of the switching transistor 64 via the resistor 78 so as to control the switching transistor 64 to be turned on or off. That is, when the controlling transistor 80 makes the collector current flow via the resistors 88 and 78, the switching transistor 64 is turned on. On the other hand, when the controlling transistor 80 makes no emitter current flow, the switching transistor 64 is turned off. Please note that the resistor 88 is a resistor electrically connecting the second transmission line 100 and the resistor 78. Moreover, the Zener diode 86 is provided in parallel to the resistor 88, and clamps the voltage applied to the resistor 88.

The duty controller 67 controls whether or not the emitter current is made to flow through the controlling transistor 80 so as to control the duration ratio of the ON-state and OFF-state of the switching transistor 64. By controlling the duration ratio of the ON-state and OFF-state of the switching transistor 64, a desired power can be supplied to the light source units 30.

In addition, the duty controller 67 includes a means for detecting that the switch 56 is in the ON-state. For example, the duty controller 67 detects whether or not the switch 56 is in the ON-state, by detecting the power-supply voltage or current supplied to the circuit board 40 via the second transmission line 100. The duty controller 67 controls the duration ration of the ON-state and OFF-state of the switching transistor 64 in a case where the switch 56 is in the ON-state. For example, while the power-supply voltage supplied from the second transmission line 100 is supplied to the duty controller 67 as a driving voltage, the duty controller 67 may be operated only when the switch 56 is in the ON-state.

The chopper controller 76 further includes a resistor 112, a resistor 114, a transistor 110, a resistor 106, a Zener diode 108, a resistor 104 and a transistor 102. These components detect whether or not the switch 50 is in the ON-state, and turn the switching transistor 64 off when the switch 50 is in the ON-state so as to stop the supply of the power to the light source units 30.

The resistors 112 and 114 are provided between the first resistor 46 and the ground in series. The transistor 110 is connected between the resistors 112 and 114 at its base terminal, and makes the emitter current flow to the ground when the switch 50 is turned on. In other words, by means of the resistors 112 and 114 and the transistor 110, it is detected whether or not the switch 50 is in the ON-state.

The resistor 106 is provided between the second transmission line 100 and the collector terminal of the transistor 110. The transistor 102 is connected to the resistor 106 via the resistor 104 at its base terminal. When the transistor 110 made the emitter current flow, a current flows through the resistor 106 and the transistor 102 receives the emitter current from the second transmission line 100. In addition, the transistor 102 supplies the collector current to the resistor 78, thereby keeping the switching transistor 64 in the OFF-state. In this manner, only when the switch 50 is in the OFF-state and the switch 56 is in the ON-state, the power for which chopper control was performed can be supplied to the light source units 30. That is, even in a case where both the switches 50 and 56 are in the ON-state, it is possible to prevent the supply of excess current to the light source units 30, thereby protecting the light source units 30.

The Zener diode 108 is connected to the resistor 106 and bypasses the power-supply current to the ground in a case where dump surge or the like occurred. Thus, it is possible to turn the transistor 102 on and turn the switching transistor 64 off, thereby the light source units 30 can be protected.

According to the vehicular lamp 10 in this example, in a case where the power is supplied from the first transmission line 98 to the light source units 30, the light source units 30 can be protected from dump surge or the like by means of the current limiting circuit 42. On the other hand, in a case where the power is supplied from the second transmission line 100 to the light source units 30, the power reduced by chopper control is supplied to the light source units 30, and therefore the light source units 30 can be protected from dump surge or the like.

Figure 8:
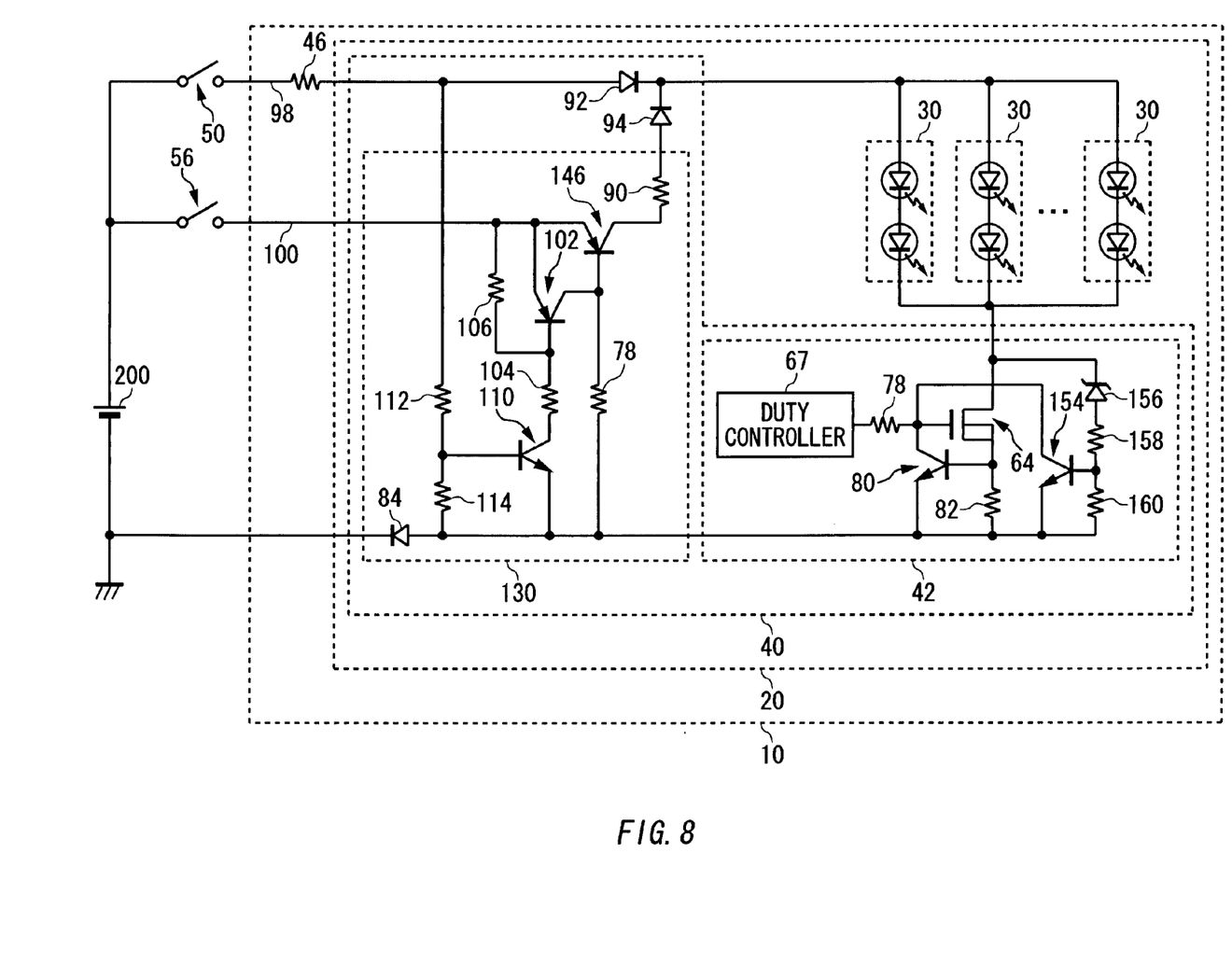
FIG. 8 shows still another exemplary circuit structure of the vehicular lamp.

FIG. 8 shows still another example of circuit structure of the vehicular lamp 10. The vehicular lamp 10 in this example serves as a taillight of the vehicle such as a car, and a stop lamp that emits brighter light than the taillight, for example. In a case of the taillight, the vehicular lamp 10 performs chopper control for the current flowing through the light source unit 30 so as to control the light amount of the light emitted by the light source unit 30. In FIG. 8, a power supply 200, switches 50 and 56, the first and second transmission lines 98 and 100, the first resistor 46 and a plurality of light source units 30 are the same as corresponding components in FIG. 7.

In this example, the vehicular lamp 10 includes a current limiting circuit 42, a mode switching part 130 and diodes 92 and 94 that are provided on a circuit board 40 in the inside of the lamp body 20. The diodes 92 and 94 are the same as the diodes 92 and 94 in FIG. 7.

The mode switching part 130 detects whether or not the switch 50 is in the ON-state like the shopper controller 76 described referring to FIG. 7, and turns the switching transistor 64 off when the switch 50 is in the ON-state, thereby stopping the supply of the power to the light source units 30.

The mode switching part 130 includes a resistor 112, a resistor 114, a resistor 106, a resistor 104, a transistor 110, a transistor 102, a resistor 78 and a transistor 146. The components of the mode switching part 130 labeled with the same reference numerals as those in the chopper controller 76 in FIG. 7 have the same functions as components in FIG. 7.

The transistor 146 is provided between the second transmission line 100 and the light source units 30, and limits the power to be supplied to the light source units 30. As is the case with the example shown in FIG. 7, when the switch 50 is in the ON-state, the transistor 102 makes the collector current flow to the ground via the resistor 78. At this time, a voltage corresponding to the voltage drop in the resistor 78 is applied to a gate terminal of the transistor 146 and the transistor 146 stops the supply of the power to the light source units 30. Thus, only in a case where the switch 50 is in the OFF-state and the switch 56 is in the ON-state, it is possible to supply the power to the light source units 30 from the second transmission line 100. In other words, even if both the switches 50 and 56 are in the ON-state, it is possible to prevent an excess current from flowing in the light source units 30, thereby the light source units 30 can be protected.

The current limiting circuit 42 has a similar function and structure to those of the current limiting circuit 42 described referring to FIG. 6. The current limiting circuit 42 in this example includes the structure of the current limiting circuit 42 shown in FIG. 6 and also includes a transistor 154, a Zener diode 156, a resistor 158 and a resistor 160. These listed components turn the switching transistor 64 off so as to protect the light source units 30, in a case where a drain voltage of the switching transistor 64 increases due to dump surge or the like.

The Zener diode 156 is provided between the light source units 30 and the ground in parallel to the switching transistor 64. When the drain voltage of the switching transistor 64 becomes higher than a threshold voltage of the Zener diode 156 due to dump surge or the like, the Zener diode 156 makes at least part of the supplied current supplied to the light source units 30 flow to the ground via the resistors 158 and 160 connected in series.

The base terminal of the transistor 154 is connected between the resistors 158 and 160, and the transistor 154 is turned on when a current flows through the resistors 158 and 160. The collector terminal of the transistor 154 is connected between the resistor 78 and the gate terminal of the switching terminal 64, and the emitter terminal of the transistor 154 is connected to the ground. When the transistor 154 was turned on, a current flows from the resistor 78 to the ground through the transistor 154 and the switching transistor 64 is turned off. In this manner, in a case where dump surge or the like occurred, the current to be supplied to the light source units 30 can be made zero completely, instead of being merely limited by the resistor 82, thus protecting the light source units 30.

Figure 9:
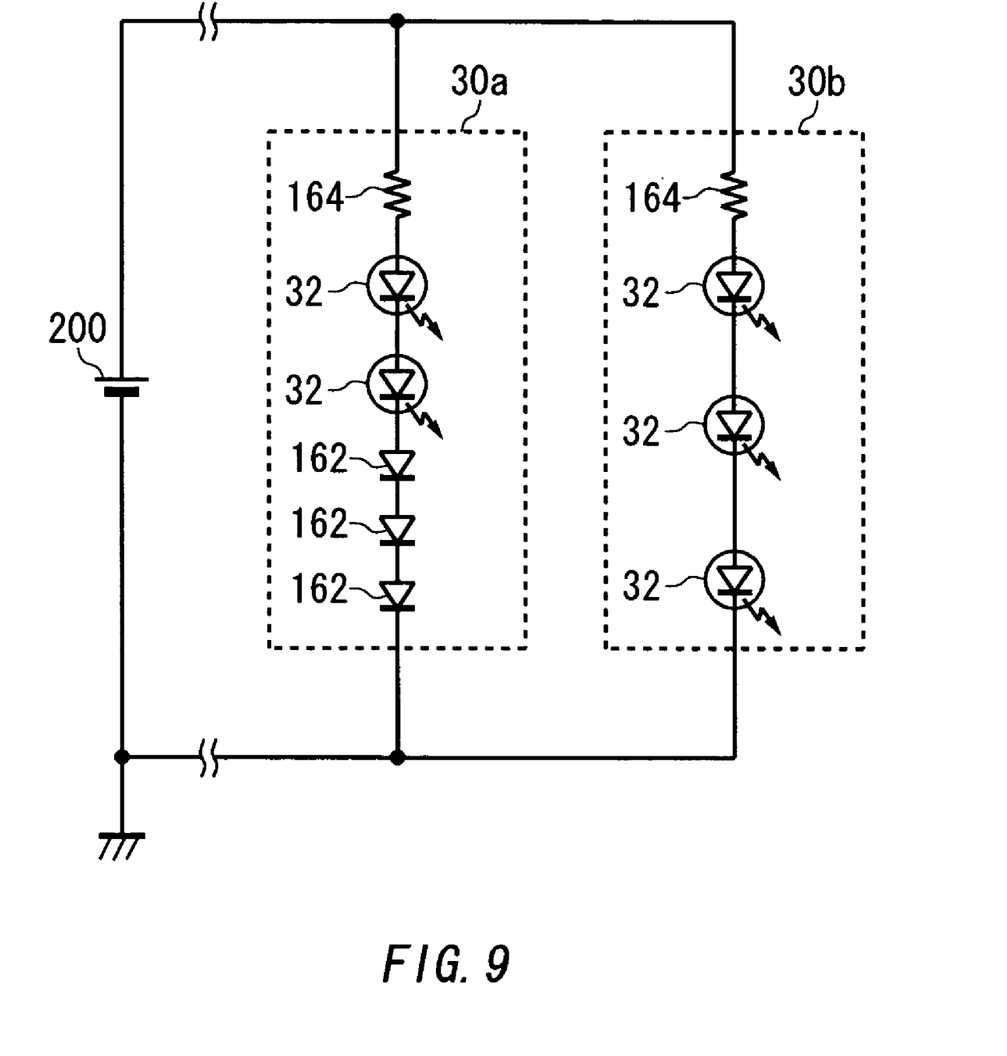
FIG. 9 shows an exemplary structure of light source units.

FIG. 9 shows an example of the structure of a plurality of light source units 30. Each of the light source units 30 includes a single or a plurality of light sources 32 connected in series, and a resistor 164 connected in series with the light source 32 for defining a supplied current to be supplied to the light source 32. In this example, a case is described where the vehicular lamp 10 includes light source units 30a and 30b and the light source unit 30b contains more light sources 32 than the light source unit 30a.

In a case where the number of contained light sources 32 is different between the light source units 30, the sum of forward voltages of the light sources 32 is different between the light source units 30. In this case, by setting a resistance value of each resistor 164 in accordance with the number of the contained light sources 32 in the same light source unit 30, currents to be supplied to the respective light source units 30 can be made approximately the same.

In this case, however, when the power-supply voltage generated by the power supply 200 varied, the currents to be supplied to the respective light source units 30 also vary.

The light source unit 30 in this example may include one or more diodes 162 connected in series with the light source 32. The number of the diodes 162 is determined in accordance with the difference between that light source unit 30 and other light source units 30. Moreover, the resistors 164 of the respective light source units 30 in this example have approximately the same resistance values. That is, the light source unit 30 may include one or more diodes 162 for correcting variation in the forward voltage by the light source 32 caused by the difference of the number of light sources 32 between that light source unit 30 and the other light source units 30.

In this example, the light source unit 30a containing less number of light sources 32 includes one or more diodes 162 for correcting the difference of forward voltage by the light source 32. In this manner, even in a case where the supplied currents to be supplied to the respective light source units 30a and 30b are made approximately the same and the power-supply voltage generated by the power supply 200 varied, the supplied currents can be kept approximately the same. Thus, it is possible to make the light sources 32 emit light with even brightness. That is, variation in emitted light such as irregular color in the light source units 30 can be reduced.

Figure 10:
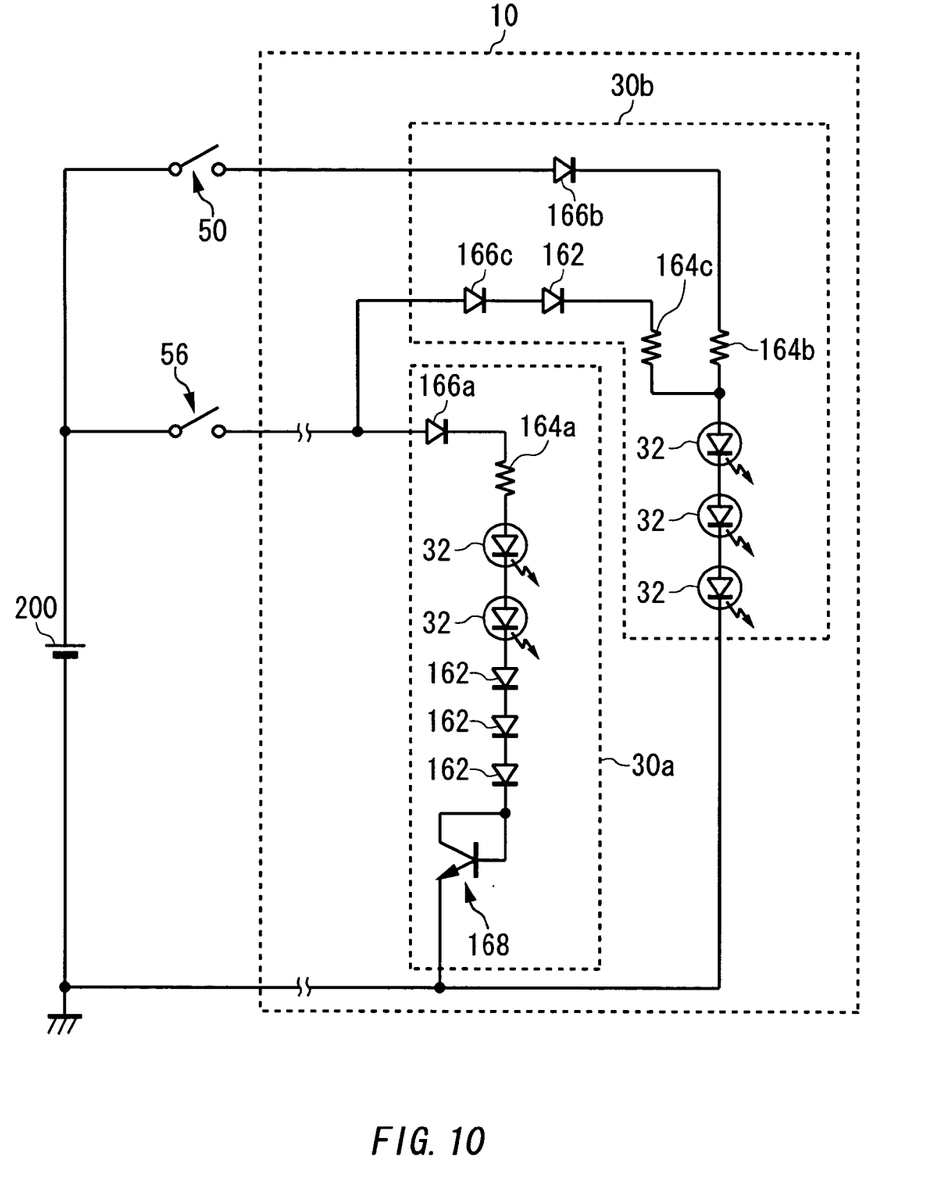
FIG. 10 shows still another exemplary circuit structure of the vehicular lamp.

FIG. 10 shows still another example of the structure of the vehicular lamp 10. The vehicular lamp 10 in this example serves as a taillight of the vehicle such as a car, and a stop lamp that emits light brighter than the taillight. The vehicular lamp 10 includes light source units 30a and 30b. The vehicular lamp 10 may include a current limiting circuit 42 described referring to FIG. 3 or 5 between a switch 56 and the light source units 30a and 30b. Moreover, the vehicular lamp 10 is connected to a power supply 200 via switches 50 and 56 as is the case with the vehicular lamp 10 described referring to FIG. 2.

The light source unit 30a includes a diode 166a connected in series with the switch 56 for preventing a reverse current, one or more light sources 32 connected in series with the diode 166a, a resistor 164a provided between the diode 166a and the light sources 32 for defining a supplied current to be supplied to the light source 32 and one or more diodes 162 connected in series with the light source 32. The diodes 162 are provided for correcting the variation of the sum of forward voltages of light sources 32 between a plurality of light source units, like the diode 162 described referring to FIG. 9.

The light source unit 30b includes a diode 166b connected in series with the switch 50 for preventing a reverse current, a resistor 164b connected in series with the diode 166b, a diode 166c connected in series with the switch 156 for preventing a reverse current, a resistor 164c connected in series with the diode 166c and light sources 32 provided between the resistors 164b and 164c. The number of the light sources 32 in the light source unit 30b is more than that in the light source unit 30a.

The light source unit 30a may include a transistor 168 functioning as a diode, in place of the diode 162. For example, in order to finely adjust the forward voltage, the transistor 168 may be included as a diode having different forward voltage. Moreover, the forward voltage may be finely adjusted by using a Schottky diode, Zener diode or the like, having different characteristics as the diode 162. Also, the light source unit 30b may further include the diode 162 for finely adjusting the forward voltage.

According to the vehicular lamp 10 in this example, the currents to be supplied to a plurality of light sources 32 in the light source units 30 can be made approximately the same. Thus, variation in light emission such as irregular color or uneven brightness or the like can be reduced.

As is apparent from the above, according to a vehicular lamp of the present invention, it is possible to reduce the temperature increase in the inside of a lamp body caused by heat generation in a resistor that defines a supplied current to be supplied to a light source, by providing that resistor in the outside of the lamp body. Thus, the vehicular lamp of the present invention can emit light precisely. Moreover, while the above resistor is provided in the outside of the lamp body, a circuit for controlling the supplied current to be supplied to the light source can be provided in the inside of the lamp body. Thus, the vehicular lamp of the present invention can emit light precisely and safely.

Although the present invention has been described by way of exemplary embodiments, it should be understood that those skilled in the art might make many changes and substitutions without departing from the spirit and the scope of the present invention which is defined only by the appended claims.

What is claimed is:

1. A vehicular lamp used in a vehicle, comprising: a light source operable to emit light in accordance with power given thereto; a lamp body operable to accommodate said light source and protect said light source from water; a first resistor provided in an outside of said lamp body and connected in series with said light source; and a current limiting circuit, provided in an inside of said lamp body, operable to prevent an excess current supplied to said light source in a case where dump surge occurs in a supplied voltage or current to be supplied to said light source, wherein said current limiting circuit reduces a current flowing through said first resistor in a case where a voltage supplied to said first resistor is equal to or higher than a predetermined voltage.

2. A vehicular lamp as claimed in claim 1, further comprising a transmission line operable to apply a voltage generated by an external power supply to said current limiting circuit, wherein said current limiting circuit supplies a current received from said transmission line to said first light source via said first resistor in a case where a voltage received from said transmission line is lower than the predetermined voltage, and bypasses at least part of the current received from said transmission line to ground in a case where the voltage received from said transmission line is higher than the predetermined voltage.

3. A vehicular lamp as claimed in claim 2, wherein said vehicular lamp is a lamp serving as a taillight of said vehicle and a stop lamp that emits light brighter than said taillight by an external switch, said vehicular lamp further includes a second resistor provided in the inside of said lamp body, said second resistor being connected in parallel to said first resistor and in series with said light source and having a larger resistance value than said first resistor, said first resistor receives power from said external power supply via said switch in a case where said vehicular lamp serves as said stop lamp, and said second resistor receives the power from said external power supply via said switch in a case where said vehicular lamp serves as said taillight.

4. A vehicular lamp used in a vehicle, comprising: a light source operable to emit light in accordance with power given thereto; a lamp body operable to accommodate said light source and protect said light source from water; a first resistor provided in an outside of said lamp body and connected in series with said light source; and a current limiting circuit, provided in an inside of said lamp body, operable to prevent an excess current supplied to said light source in a case where dump surge occurs in a supplied voltage or current to be supplied to said light source, wherein said vehicular lamp is a lamp serving as a taillight of said vehicle and a stop lamp that emits light brighter than said taillight, and said current limiting circuit includes: a switching transistor, connected in series with said light source, operable to repeatedly switch whether or not a current is supplied to said light source; and a duty controller operable to keep said switching transistor in ON-state in a case where said vehicular lamp serves as said stop lamp and to control a duration ratio of an ON-state and an OFF-state of said switching transistor to control power to be supplied to said light source in a case where said vehicular lamp serves as said taillight.

5. A vehicular lamp used in a vehicle, comprising: a light source operable to emit light in accordance with power given thereto; a lamp body operable to accommodate said light source and protect said light source from water; a first resistor provided in an outside of said lamp body and connected in series with said light source; and a current limiting circuit, provided in an inside of said lamp body, operable to prevent an excess current supplied to said light source in a case where dump surge occurs in a supplied voltage or current to be supplied to said light source, wherein said current limiting circuit is provided between said first resistor and said light source, detects a resistor current flowing through said first resistor and bypasses a part of said resistor current to ground in a case where said detected resistor current is larger than a predetermined current.

6. A vehicular lamp as claimed in claim 5, wherein said current limiting circuit includes: a limiting transistor, provided between said first resistor and said light source, operable to limit a current supplied from said first resistor to said light source, and a controlling transistor operable to bypass a part of said resistor current to said ground and make said limiting transistor limit the current supplied to said light source, in a case where the resistor current is larger than the predetermined current.

7. A vehicular lamp as claimed in claim 6, wherein said vehicular lamp is a lamp serving as a taillight of said vehicle and a stop lamp that emits light brighter than said taillight, and said vehicular lamp further includes: a chopper control ler operable to turn said light source on and off to reduce brightness of said light source; a first transmission line operable to supply a power-supply voltage generated by an external power supply to said first resistor in a case where said vehicular lamp serves as said stop lamp; and a second transmission line operable to supply the power-supply voltage to said chopper controller to make said light source emit light with reduced brightness in a case where said vehicular lamp serves as said taillight.

8. A vehicular lamp as claimed in claim 7, wherein said chopper controller includes: a switching transistor operable to repeatedly switch whether or not a current generated by said external power supply is supplied to said light source; and a duty controller operable to control a duration ratio of an 0 ON-state and an OFF-state of said switching transistor, and said duty controller turns said switching transistor off in a case where said first transmission line supplies the power-supply voltage to said first resistor.

* * * * *